United States Patent
Qu et al.

(10) Patent No.: US 8,059,665 B2
(45) Date of Patent: Nov. 15, 2011

(54) SYSTEMS AND METHODS FOR PROVIDING LOCATION INFORMATION

(75) Inventors: Jing Qu, Reston, VA (US); Manish Sharma, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 1580 days.

(21) Appl. No.: 11/125,141

(22) Filed: May 10, 2005

(65) Prior Publication Data

US 2006/0256812 A1   Nov. 16, 2006

(51) Int. Cl.
 *H04L 12/56* (2006.01)
(52) U.S. Cl. .................................... 370/401
(58) Field of Classification Search ........... 370/401, 370/466, 467, 389, 392, 393, 465, 471, 474, 370/475
See application file for complete search history.

(56) References Cited

U.S. PATENT DOCUMENTS

| | | | | |
|---|---|---|---|---|
| 5,970,062 A | * | 10/1999 | Bauchot | 370/310.2 |
| 5,974,452 A | * | 10/1999 | Karapetkov et al. | 709/218 |
| 6,330,239 B1 | * | 12/2001 | Suzuki | 370/395.1 |
| 6,801,542 B1 | * | 10/2004 | Subbiah | 370/467 |
| 6,904,140 B2 | * | 6/2005 | Trossen | 379/207.04 |
| 7,289,464 B2 | * | 10/2007 | Li et al. | 370/328 |
| 7,523,185 B1 | * | 4/2009 | Ng et al. | 709/223 |
| 2004/0008666 A1 | * | 1/2004 | Hardjono | 370/352 |
| 2005/0113095 A1 | * | 5/2005 | Allison | 455/445 |
| 2005/0114513 A1 | * | 5/2005 | Dorenbosch et al. | 709/227 |
| 2005/0117556 A1 | * | 6/2005 | Lee et al. | 370/338 |
| 2005/0220095 A1 | * | 10/2005 | Narayanan et al. | 370/389 |
| 2006/0129646 A1 | * | 6/2006 | Rhee et al. | 709/206 |
| 2008/0022000 A1 | * | 1/2008 | Furuya et al. | 709/228 |

\* cited by examiner

*Primary Examiner* — Ricky Ngo
*Assistant Examiner* — Wei-Po Kao

(57) ABSTRACT

Systems and methods for obtaining location information for a communication station in a first domain by a communication station in a second domain are provided. The communication station in the second domain embeds a location request message in a message formatted according to a first communication protocol, and transmits the message formatted according to the first communication protocol to a proxy server. The proxy server removes the embedded request message and forwards it to a location server, which is located in the first domain. The proxy server receives a location response message and embeds it in another message formatted according to the first communication protocol. The proxy server then transmits the another message formatted according to the first communication protocol to the communication station in the second domain, which can remove the embedded location response message.

17 Claims, 4 Drawing Sheets

SYSTEMS AND METHODS FOR PROVIDING LOCATION INFORMATION

BACKGROUND OF THE INVENTION

Modern communications technology provides a number of different ways for people to communicate. One popular form of communication is instant messaging, which is a text-based form of communication. Users employ instant messaging clients, which communicate with each other via an instant messaging server. Typically, in order for people to communicate with each other using instant messaging, their instant messaging clients must use the same communication protocols.

Currently most instant messaging clients and servers operate using proprietary protocols. Proprietary protocols are those which operate according to specifications that are not freely available to the public. In contrast to proprietary protocols, open protocols are based on specifications which are freely available to the public. Instant messaging clients operating according to different proprietary protocols cannot directly communicate with each other.

A number of different solutions have been developed to overcome the problems of proprietary instant messaging protocols. For example, instant messaging clients which operate according to different proprietary protocols have been developed. Accordingly, a single instant messaging client can be used to communicate with a variety of different instant messaging clients which operate according to a variety of different proprietary protocols. However, the operators of the instant messaging servers, which operate according to proprietary protocols, can modify their protocols, thereby preventing the use of these multi-protocol instant messaging clients.

Another technique for communicating using instant messaging clients, which operate according to different protocols, is to use a gateway. A gateway is a hardware devices that translates between the different protocols. However, changes to either of the different protocols results in costly upgrades to the gateway. Additionally, the owners of the proprietary protocols may modify their protocols to prevent the use of gateways.

While instant messaging clients which operate according to open protocols have been developed, the ability to add new features is quite limited. Specifically, open protocols are typically developed by standards bodies in a manner which requires years of work before publication of the final specification for the protocol. Accordingly, changes to the open protocols can likewise require a long time before they are approved by the standards body. Additionally, a client operating using an open protocol cannot easily communicate with a client operating using a different open protocol, or even a proprietary protocol.

Although it is possible to add features to open protocols which are not covered by the final specification of an open protocol, the additional features would only be supported by clients designed to support the additional features, and would require either an instant messaging server which supports the additional features or a gateway that can translate the protocols of the additional features between the compatible instant messaging clients. Accordingly, every time a feature is added to an open protocol instant messaging client outside of the final specification, the instant messaging servers or gateway must be updated to support the new features, both of which can be quite costly.

Dispatch communications are voice communications that are similar to text-based instant messaging communications. Dispatch communications are typically provided in wireless communication networks, although they can be provided between a communication station supported by a wireless communication network and a communication station supported by a wired communication network. Like instant messaging, dispatch communications require communication devices to operate according to the same protocol or employ gateways. Similar to instant messaging, dispatch communication protocols can be either open or proprietary. The use of open or proprietary dispatch communication protocols have similar advantages and disadvantages to those discussed above in connection with instant messaging protocol.

In view of the above-identified and other deficiencies of conventional instant messaging or dispatch communication systems, it would be desirable to provide systems and methods that can support additional features in an open protocol instant messaging or dispatch communication system which does not require upgrades to the instant messaging or dispatch communication server, or require a gateway.

SUMMARY OF THE INVENTION

The present invention overcomes the above-identified and other deficiencies of conventional instant messaging and dispatch communication systems by providing an proxy server to support additional features for instant messaging or dispatch communication systems. In particular, the proxy server receives a message, formatted in a first communication protocol, with an embedded location request message. The embedded location request message is formatted according to a second communication protocol that is not compatible with the first communication protocol. The proxy server removes the embedded location request message, and forwards it to a location server. When the proxy server receives a location response message, the proxy server embeds the response message in another message formatted according to the first communication protocol. The proxy server then sends the another message formatted according to the first communication protocol to the communication station which requested the location information.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1A:
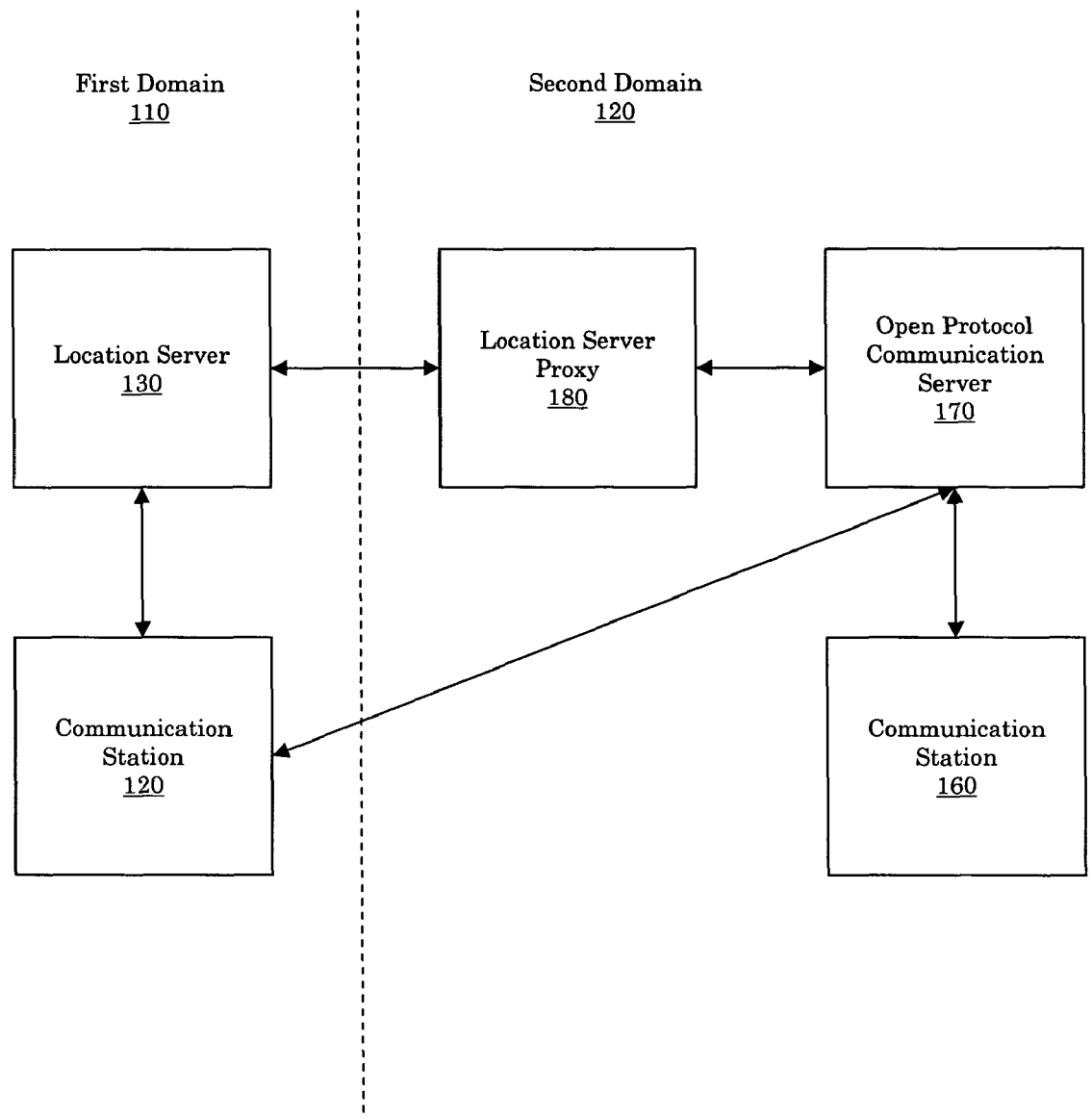
FIG. 1a is a block diagram of an exemplary system in accordance with the present invention.

FIG. 1a illustrates an exemplary system for communication between communication stations located in different domains in accordance with the present invention. The communication stations can communicate using dispatch voice communications, text-based instant messaging communications, or any other communications which employs text-based session protocol and presence service. In accordance with exemplary embodiments of the present invention, session initiation protocol (SIP) can be used to convey signaling and control messages between the communication stations, and real-time protocol (RTP) can be used to convey the media. The system includes a first domain 110 and a second domain 150. The first and second domains 110 and 150 can be different networks. For example, the first domain 110 can be a wireless network and the second domain 150 can be a wired network, such as a data network.

The first domain 110 includes a communication station 120 and location server 130. The location server 130 can determine the geographical location of the communication station 120. For example, if the first domain 110 is a wireless network and communication station 120 is a mobile station, the location server 130 can send a location request to communication station 120, which will respond with its current location. The communication station 120 can determine its own location using a Global Positioning Satellite (GPS) receiver or other known triangulation techniques. It will be recognized that if the first domain 110 is a wireless network, there will be a number of components which couple the communication station 120 to the location server 130, including a base station. Accordingly, the location server 130 can also obtain the location of the communication station 120 by using the geographical location of the base station that is currently supporting the communication station 120, which will be less accurate than a geographical location determined using GPS or other triangulation techniques. Additionally, the location server can use measurements of the communication station's signals from three or more base stations to triangulate the location.

The second domain 150 includes a communication station 160, open protocol communication server 170 and location proxy server 180. If the second domain 150 is a wired network, the communication station 160 can be a computer running a communication client, such as an instant messaging or dispatch communication client. The open protocol communication server 170 can be a SIP server, which supports voice and/or text communication between communication stations 120 and 160. Again, it will be recognized that there will be a number of components which couple the communication station 120 to open protocol server 170 for communicating with communication station 160, which are not necessary for an understanding of the invention. As will be described in more detail below, the location server proxy 180 forwards location requests and responses between communication station 160 to location server 130.

Figure 1B:
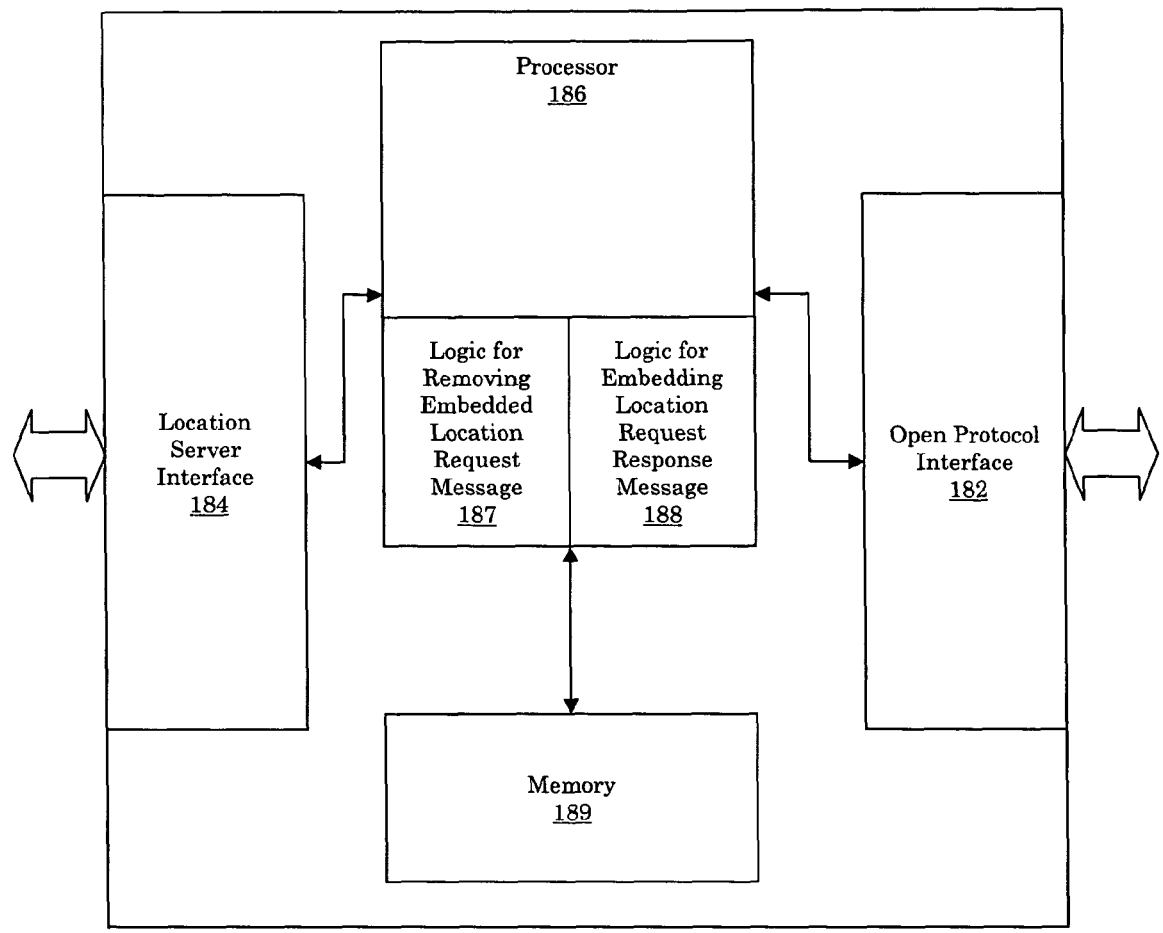
FIG. 1b is a block diagram of an exemplary proxy server in accordance with the present invention.

FIG. 1b illustrates an exemplary proxy server in accordance with the present invention. The proxy server 180 includes an open protocol interface 182 for communicating with open protocol communication server 170, and location server interface 184 for communicating with location server 130. Coupled between the interfaces is a processor 186. Processor 186 includes logic for removing embedded location request messages 187 and logic for embedding location response messages 188, which will be described in more detail below. Processor 186 can be a microprocessor running program code, an application specific integrated circuit (ASIC), field programmable gate array (FPGA), or the like.

Memory 189 is coupled to processor 186 and can be used for queuing messages between the first and second domains, storing a program for operating processor 186, and/or other conventional functions of a conventional proxy server memory. Memory 189 can be random access memory, read only memory, flash memory, a hard drive and/or the like.

Figure 2A:
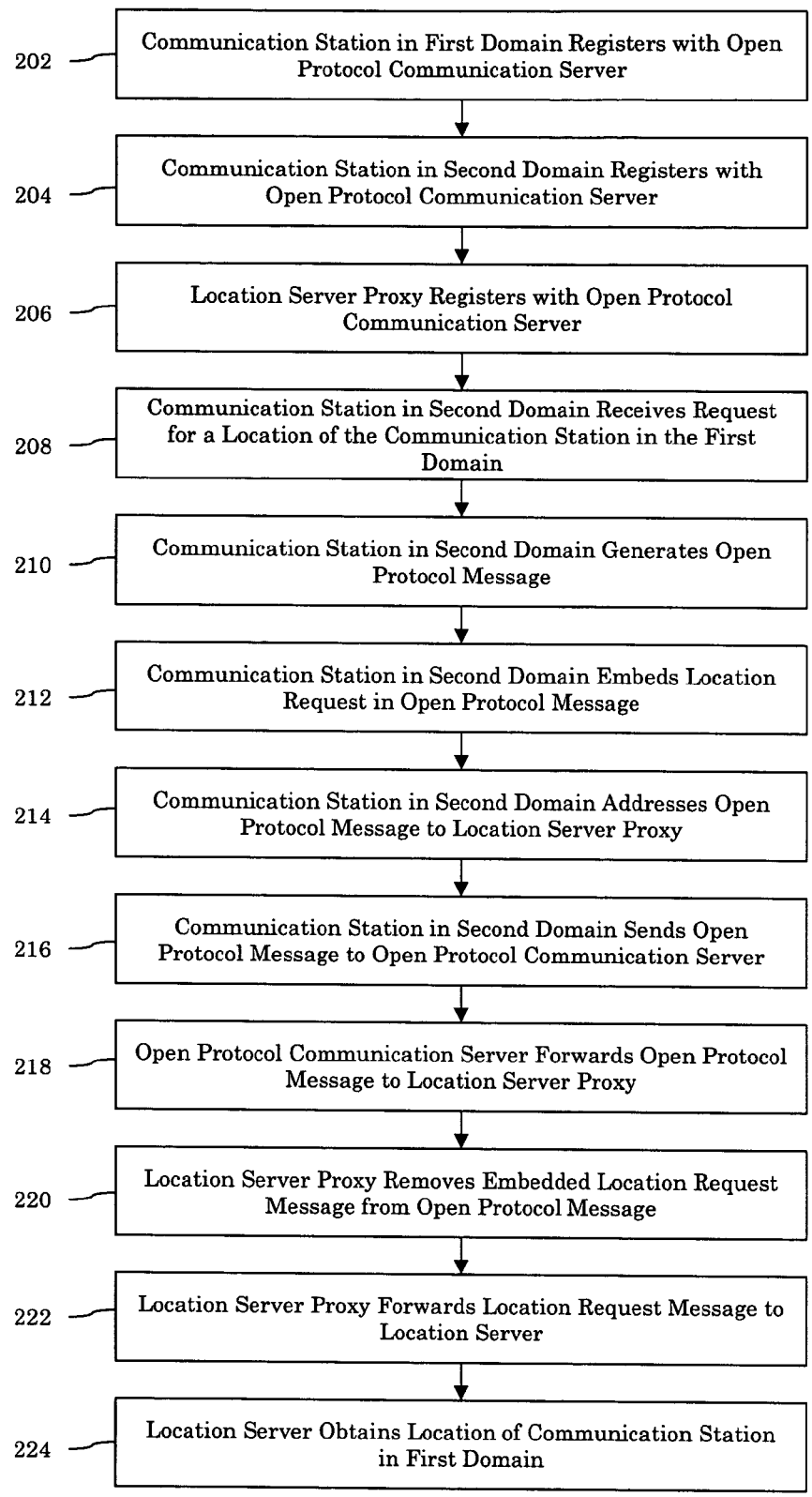
FIGS. 2a and 2b are flow diagrams illustrating an exemplary method in accordance with the present invention.
Figure 2B:
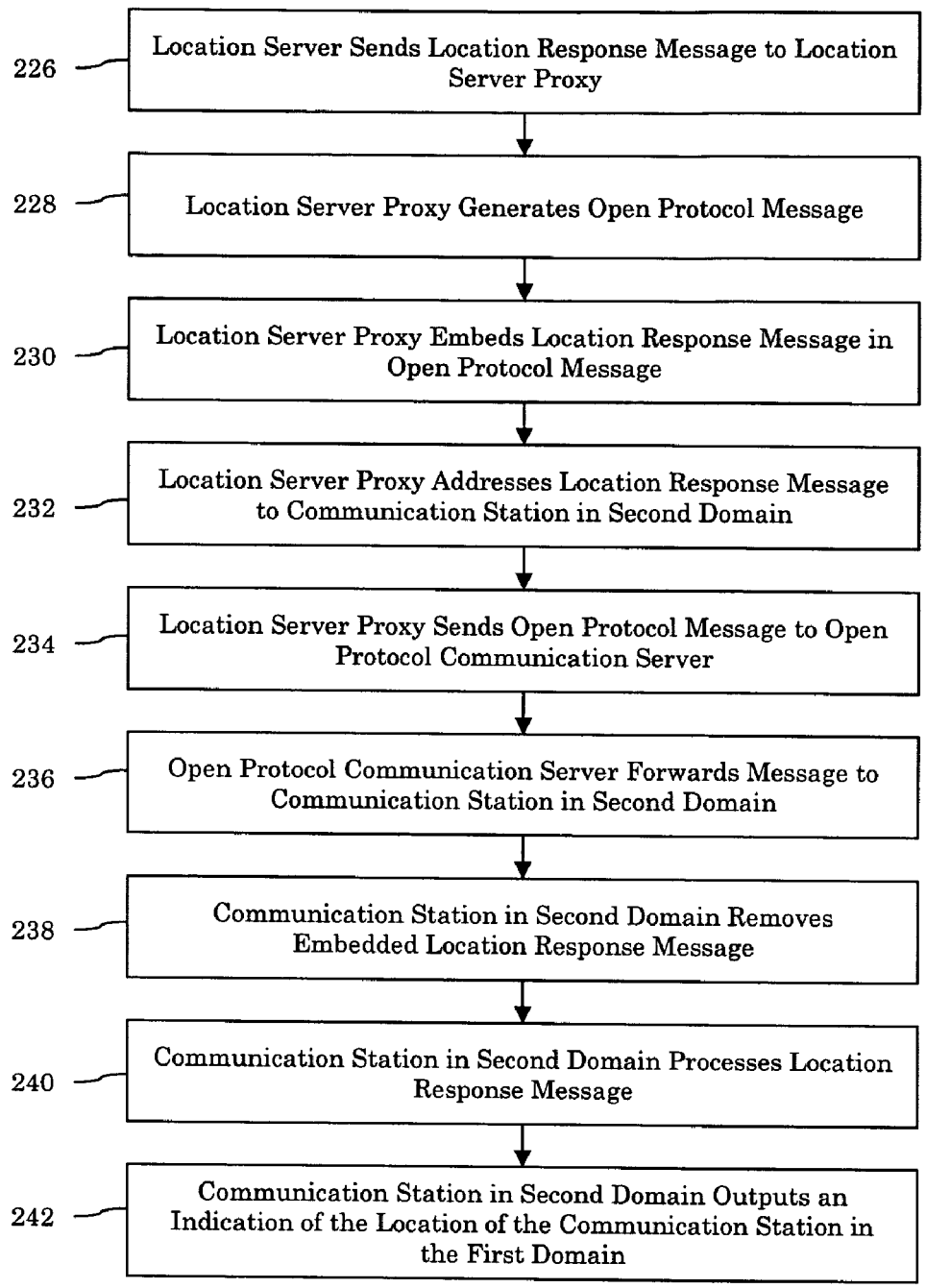

FIGS. 2a and 2b illustrate an exemplary method in accordance with the present invention. In order for communication stations 120 and 160 to exchange voice and/or text communications with each other, communication stations 120 and 160 register with the open protocol communication server 170 (steps 202 and 204). After the communication stations register with the open protocol communication server 170, they can exchange voice and/or text communications with each other in accordance with the open protocol. To support location requests from communication station 160 for the geographic location of communication station 120, the location proxy server 180 registers with open protocol communication server 170 (step 206).

When communication station 160 receives a request for the location of communication station 120, communication station 160 generates an open protocol message (steps 208 and 210). The request for the location of communication station can be explicit, e.g., the user of communication station 160 entering the request into the communication station, or it can be implicit, e.g., when the client for communicating with communication station 120 is started. If the open protocol is SIP, the open protocol message can be a SIP MESSAGE. Communication station 160 embeds a location request message in the open protocol message, addresses the open protocol message to location proxy server 180, and forwards the open protocol message to open protocol communication server 170 (steps 212, 214 and 216). The location request message is embedded in the location request message because it is formatted in a protocol (either open or proprietary) which is not compatible with the open protocol. Accordingly, the location request message can be transported in a transparent manner through the open protocol communication server 170.

When the open protocol communication server 170 receives the open protocol message, the open protocol communication server 170, based on the address of the message, will forward it to the location proxy server 180 (step 218). The open protocol interface 182 of the location server proxy 180 receives the message and provides it to processor 186. Logic 187 of the location proxy server 180 removes the embedded location request message from the open protocol message and forwards the removed message to the location server 130 via location server interface 184 (steps 220 and 222). In response to receiving the location request message, location server 130 obtains the location of communication station 120 using any of the techniques described above (step 224).

After obtaining the location of communication station 120, the location server 130 sends a location response message to the location server proxy 180 (step 226). The location server proxy 180 receives the location response message over location server interface 184. Processor 186 generates an open protocol message, and logic 188 of processor 186 embeds the location response message therein (steps 228 and 230). Processor 186 of the location server proxy 180 addresses the open protocol message to communication station 160 and sends the message to the open protocol communication server 170 via open protocol interface 182 (steps 232 and 234). The open protocol server 170 forwards the message to communication station 160 (step 236). Communication station 160 removes the embedded location response message, processes the response message and outputs an indication of the location of communication station 120 (steps 238, 240 and 242).

The manner in which the indication of the location is output can take a number of different forms, such as being output on a display of communication station 160. For example, instant messaging and dispatch communication clients typically display presence information for people in a contact list. However, the presence information is typically very limited, e.g., whether the user is logged into the client or not. Accordingly, the present invention can provide the location information in connection with presence information. For example, a user can designate particular geographic areas with particular presence information, such as being in the office. Additionally, the location server proxy 180 can provide predetermined presence information based on the location information, e.g., at the airport.

The location information provided by the present invention can be used for to filter communication session requests. For example, to reduce latency during the communication session, a user can initiate a group communication session between a number of users based on location, e.g., all users located in a particular geographic area.

By providing a proxy server between the first and second domains, the location request and response messages, which are formatted according to a protocol that is not compatible with one protocol, can be passed transparently through the protocol communication server. Accordingly, additional features can be added to the communication stations, by providing updated clients supporting the additional features, without requiring the use of a gateway.

Although some embodiments of the present invention have been described with one domain employing an open protocol and the other domain employing a proprietary protocol, it should be recognized that both domains can employ different open protocols and/or different proprietary protocols. Additionally, the domain with the communication server can employ a proprietary protocol and the domain with the location server can employ an open protocol.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for obtaining a location of a communication station in a first domain by a communication station located in a second domain, comprising the acts of:
   generating, by the communication station in the second domain, a message and a request for the geographical location of the communication station in the first domain;
   embedding, by the communication station in the second domain, the request in the message;
   addressing the message with the embedded request to a proxy server in the second domain;
   transmitting, by the communication station in the second domain, the message with the embedded request to the proxy server in the second domain via a communication server in the second domain; and
   receiving, by the communication station in the second domain, a response including the geographical location of the communication station in the first domain determined by the communication station in the first domain, wherein the request is formatted according to a first communication protocol, and the message and response are formatted according to a second communication protocol, and wherein the second communication protocol is session initiation protocol (SIP).

2. The method of claim 1, wherein the first communication protocol is an open communication protocol which is different from the second communication protocol.

3. The method of claim 1, wherein the communication station in the first domain is a mobile station.

4. The method of claim 1, wherein the first communication protocol is a proprietary communication protocol.

5. The method of claim 1, wherein the communication stations in the first and second domains communicate with each other using an open communication protocol.

6. The method of claim 1, wherein the communication server forwards the message with the embedded request to a proxy server.

7. The method of claim 1, wherein the proxy server performs the acts of:
   removing the embedded request from the message;
   forwarding the request to a location server in the first domain;
   receiving a location response from the location server;
   embedding the location response in another message formatted according to an open communication protocol; and
   transmitting the another message with the embedded location response to the communication station located in the second domain.

8. A proxy server, comprising:
   a first communication protocol interface, which receives via a communication server a message generated by a first communication station and formatted according to a first communication protocol, wherein the message comprises a request generated by the first communication station for the geographical location of a second communication, and wherein the first communication protocol is session initiation protocol (SIP);
   a processor, coupled to the first communication protocol interface, which removes the embedded geographical location request to produce a location request message; and
   a location server interface, coupled to the processor, which forwards the location request message to a location server, and which receives a location response message generated by the location server comprising a geographical location of the second communication station generated by the second communication station.

9. The proxy server of claim 8, wherein the processor embeds the location response message in another message formatted according to the first communication protocol, and forwards the another message formatted according to the first communication protocol over the first communication protocol interface.

10. The proxy server of claim 8, wherein the location request message is formatted according to a second communication protocol.

11. The proxy server of claim 10, wherein the second communication protocol is a proprietary protocol.

12. The proxy server of claim 10, wherein the second communication protocol is an open communication protocol which is different from the first communication protocol.

13. A method for a proxy server in a first domain, comprising the acts of:
   receiving via a communication server in the first domain a message generated by a first communication station in the first domain formatted according to a first communication protocol, wherein the message comprises a request generated by the first communication station for the geographical location of a second communication station, and wherein the first communication protocol is session initiation protocol (SIP);
   forwarding the location request message to a location server in a second domain; and receiving a location response message generated by the location server comprising a geographical location of the second communication station generated by the second communication station.

14. The method of claim 13, further comprising the acts of:
embedding the location response message in another message formatted according to the first communication protocol; and
forwarding the another message formatted according to the first communication protocol over a first communication protocol interface.

15. The method of claim 13, wherein the location request message is formatted according to a second communication protocol.

16. The proxy server of claim 15, wherein the second communication protocol is a proprietary protocol.

17. The method claim 15, wherein the second communication protocol is an open communication protocol which is different from the first communication protocol.

* * * * *